United States Patent Office 2,798,837
Patented July 9, 1957

2,798,837

ACHLORHYDRIA COMPOSITION

Melville Sahyun, Santa Barbara, Calif.

No Drawing. Application November 20, 1952,
Serial No. 321,718

4 Claims. (Cl. 167—82)

This invention relates to a medicament for the gradual release of hydrochloric acid and is more particularly concerned with a composition for oral administration allowing a delayed hydrochloric acid liberation and including a hydrochloric acid releasing compound and methyl cellulose.

Deficiency in the natural stomach secretion of hydrochloric acid occurs in ten to fifteen percent of the population in the United States today. This condition is known as hypochlorhydria. When the most acute form of this organic deficiency is present, that is the complete absence of a discharge of hydrochloric acid, the condition is known as achlorhydria. Hydrochloric acid is utilized by the human body in the stomach to aid in the digestion of foodstuffs. Generally, hyprochlorhydria or achlorhydria commonly occurs in pernicious anemia and malignant disease of the stomch; however, neurogenic factors, chronic gastritis of eogenous origin, old age, et cetera, also show a high incidence of the pathological condition.

It has been previously proposed to treat achlorhydria and hyprochlorhydria by the oral administration of aqueous hydrochloric acid. This procedure has serious drawbacks. Foremost is the fact that the presence of acid in the mouth tends to cause general deterioration of the teeth. While effects on the teeth may be overcome by the use of a glass straw, there is still a serious factor of the excess of hydrochloric acid striking the stomach and causing those normal results associated with excesses of hydrochloric acid. Additionally, the induction of a large amount of hydrochloric acid immediately prior to eating will upset the normal production of hydrochloric acid in the stomach, and with the loss through leaving the stomach, cause a concomitant loss in the amount of the hydrochloric acid present for digestion. Further, the method of gradually inducing aqueous hydrochloric acid into the stomach during the meal is unpleasant and requires a careful attention to the eating and ingestion habits.

To overcome the difficulties of aqueous hydrochloric acid, it has been previously proposed to utilize a gelatin capsule containing betaine hydrochloride. This obviates an excess of hydrochloric acid being present in the mouth and the danger to the teeth. However, the use of such capsules results in a complete release of the hydrochloric acid in the stomach within about five minutes after administration of the capsule. Since the average meal requires between fifteen minutes and one-half hour for ingestion, the complete release of hydrochloric acid within five minutes after administration of the capsule is, of course, undesirable.

It is, therefore, an object of the present invention to provide a source of hydrochloric acid in the stomach without danger to the teeth or mouth from excess acidity. It is a further object of the present invention to provide a composition which will allow the slow release of hydrochloric acid during the course of the whole ingestion of a meal. Still a further object of the present invention is to provide a composition containing a hydrochloric acid releasing compound and methyl cellulose. A preferred object of the present invention is to provide a medicament containing betaine hydrochloride, pepsin, and methyl cellulose. Other objects will become apparent hereinafter.

The foregoing and additional objects have been accomplished by the provision of a composition containing a hydrochloric acid releasing compound and methyl cellulose, the methyl cellulose preferably being present in an amount such that each crystal of the hydrochloric acid releasing compound is substantially coated with methyl cellulose. A further embodiment of the present invention comprises the addition of pepsin to the composition and concomitant covering of the pepsin present with methyl cellulose. Hydrochloric acid releasing compounds within the scope of the present invention include the hydrochloric acid addition salts of $\alpha$-amino acids, for example, betaine hydrochloride, glutamic acid hydrochloride, arginine hydrochloride, lysine hydrochloride, histidine hydrochloride, aspartic acid hydrochloride. Betaine hydrochloride and glutamic acid hydrochloride are preferred because of their ready availability and their low cost.

Betaine hydrochloride is a crystalline compound, melting at 221–228 degrees centigrade, readily soluble in water. It yields about 24 percent hydrochloric acid when dissolved. Five-tenths gram is equivalent to about 18 minims of diluted hydrochloric acid. Glutamic acid hydrochloride is a white crystalline solid melting at 202–204 degrees centigrade, readily soluble in water, and yields about 20 percent hydrochloric acid when dissolved in water. Usually, achlorhydria is associated with a lack of pepsin in the stomach, therefore, a preferred embodiment of the present invention comprises the addition of pepsin to the composition. Pepsin is a proteolytic enzyme secreted by the stomach and is commercially available. Methyl cellulose is a stable article of commerce and is well known to the art.

The composition of the present invention is prepared by intimately mixing methyl cellulose with the hydrochloric acid releasing compound, and pepsin if desired, so that the methyl cellulose will coat substantially completely the surface of the hydrochloride and pepsin. Thereafter, the mixture may be compressed into tablets, or coated with a gelatin coating, or combined into a suitable capsule in manner well known to the art.

In calculating the amounts of hydrochloric acid releasing compound to employ in the capsule of the present invention, the following data will be useful: 0.1 normalcy of hydrochloric acid is equivalent to 0.365 percent concentration, or 3.65 milligrams per milliliter of solution. Thus 30 milliliters of 0.1 normal hydrochloric acid is equal to approximately 110 milligrams of hydrochloric acid. Generally in this art, gastric juice containing 60 milli-equivalents of acid per liter, or requiring 60 milliliters of 0.1 normal alkali to neutralize 100 milliliters, is said to have an acidity of 60 degrees, or 60 clinical units.

Preferably, the composition of the present invention contains thirty clinical units (30 cc. of 0.1 normal hydrochloric acid) however, amounts between about five clinical units and 60 clinical units will be operative. In calculating the quantity of betaine hydrochloride to be used, after the amount of hydrochloric acid desired to be released by the dose has been determined, it is figured that 24 percent of the betaine hydrochloride used is released as free hydrochloric acid in the stomach. Therefore, the factor would be 4.16 times that amount in weight of hydrogen chloride desired to determine that weight of betaine hydrochloride which must be present in each dose. Similarly, if other hydrochloric acid addition salts of $\alpha$-amino acids are used, the amount of hydrochloric acid which will be released may be determined.

The amount of methyl cellulose employed will be directly dependent on the rate of release of the hydrochloric acid in the stomach desired. Usually, the amount of methyl cellulose employed in the composition is about that amount of hydrochloric acid desired to be released by the dosage unit. Thus, the amount of free hydrochloric acid present equals that amount of methyl cellulose which will be employed. However, it is to be understood that other quantities of methyl cellulose are also suitable in the composition of the present invention, subject to the fact that the rate of release of the hydrochloric acid will be directly dependent upon the amount of methyl cellulose employed. If an immediate or rapid release of hydrochloric acid is desired, less methyl cellulose should be employed. However, if release of hydrochloric acid is to be extended over a longer period, then greater amounts of methyl cellulose will be employed. At any rate, the amount of methyl cellulose employed will be between one part to ten parts of hydrochloric acid releasing compound and one part of methyl cellulose to two parts of hydrochloric acid releasing compound. The amount of pepsin employed may be varied over a wide range, if desired, depending upon the condition of the particular patient involved, the bulk of dose desired, et cetera.

The most preferred dosage unit of the present invention comprises 455 milligrams of betaine hydrochloride, 60 milligrams of pepsin (1:10000 U. S. P. unit) and 141 milligrams of methyl cellulose. This capsule may be compressed or bound together in conventional manner.

A comparison of the tablet of the present invention with certain tablets which have been previously proposed produces the following results: When the betaine hydrochloride as a white crystalline material is dissolved in water, 90 percent of the hydrochloric acid is released from the betaine hydrochloride in less than five minutes. When a mixture of betaine hydrochloride and pepsin encompassed within a gelatin capsule is used, a 90 percent release of the hydrochloric acid results in between five and seven minutes. When the composition of the present invention was compressed into the tablet form, the release of hydrochloric acid began approximately ten minutes after contact with water, with a 90 percent release of the hydrochloric acid occurring in approximately fifty minutes. At about forty minutes, 30 percent of the hydrochloric acid had been released. Thus, when the composition of the present invention is utilized, a rate of release of hydrochloric acid is achieved which is approximately the same as that rate of release achieved by the normally functioning stomach under the influence and stimulus of a meal.

Various modifications may be made in the composition of the present invention without departing from the spirit or scope thereof and it is to be understood that I limit myself only as defined in the appended claims.

I claim:

1. A composition of matter useful for treatment of achlorhydria and hypochlorhydria comprising: a hydrochloric acid addition salt of an $\alpha$-amino acid substantially coated with methyl cellulose, said methyl cellulose being present in an amount between $1/10$ and $1/2$ the weight of said acid addition salt.

2. A composition of matter useful for treatment of achlorhydria and hypochlorhydria comprising: methyl cellulose coated on an acid-releasing salt selected from the group consisting of betaine hydrochloride and glutamic acid hydrochloride, said methyl cellulose being present in an amount between $1/10$ and $1/2$ the weight of said acid-releasing salt.

3. A composition of matter useful for treatment of achlorhydria and hypochlorhydria comprising: methyl cellulose coated on the surfaces of pepsin and an acid-releasing salt selected from the group consisting of betaine hydrochloride and glutamic acid hydrochloride, said methyl cellulose being present in an amount between $1/10$ and $1/2$ the weight of said acid-releasing salt.

4. A composition of matter useful for treatment of achlorhydria and hypochlorhydria which comprises: betaine hydrochloride, pepsin and methyl cellulose, said methyl cellulose being present in an amount about one-fifth of that of the additive weights of betaine hydrochloride and pepsin, the said methyl cellulose being on the surface of the betaine hydrochloride and pepsin crystals.

References Cited in the file of this patent

UNITED STATES PATENTS

| | | |
|---|---|---|
| 2,079,512 | Korosy | May 4, 1937 |
| 2,362,761 | Medl | Nov. 14, 1944 |
| 2,478,182 | Consolazio | Aug. 9, 1949 |
| 2,480,103 | Fux | Aug. 30, 1949 |
| 2,553,544 | Bogin | May 22, 1951 |
| 2,665,992 | Naps | Jan. 12, 1954 |

OTHER REFERENCES

Lesser: Drug and Cos. Ind., vol. 62, No. 6, June 1948, pp. 750, 751, 752, 830, 831, and 832.

Thompson et al.; J. A. P. A., Sci. Ed., vol. 34, No. 5, May 1945, pp. 135–138.

Modern Drug Enc., Gutman, 3rd ed., 1946, p. 258.

Helenore: Chain Store Age, vol. 28, p. 108, August 1951.

The Pharm. Jour., vol. 150, p. 67, Feb. 20, 1943.

Harrow: Textbook of Biochem., p. 211, 5th ed. (1951).

UNITED STATES PATENT OFFICE

CERTIFICATE OF CORRECTION

Patent No. 2,798,837                                  July 9, 1957

Melville Sahyun

It is hereby certified that error appears in the printed specification of the above numbered patent requiring correction and that the said Letters Patent should read as corrected below.

Column 1, line 32, for "eogenous" read -- exogenous --; column 2, line 25, for "221-228" read -- 227-228 --.

Signed and sealed this 24th day of September 1957.

(SEAL)
Attest:

KARL H. AXLINE                                              ROBERT C. WATSON
Attesting Officer                                       Commissioner of Patents